Sept. 9, 1969  A. JACOBSON  3,465,846

INSTALLATION FOR APPROACHING PORTIONS OF AN AIRPLANE

Filed July 10, 1967  2 Sheets-Sheet 1

INVENTOR
AMNON JACOBSON

BY

AGENT

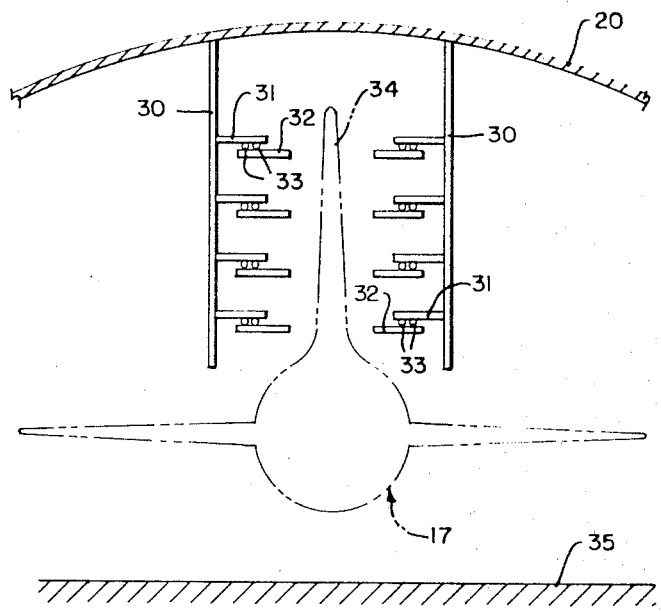

United States Patent Office 3,465,846
Patented Sept. 9, 1969

3,465,846
INSTALLATION FOR APPROACHING PORTIONS
OF AN AIRPLANE
Amnon Jacobson, Tel Aviv, Israel, assignor to Koor
Industries and Crafts Co. Ltd., Tel Aviv, Israel
Filed July 10, 1967, Ser. No. 652,126
Int. Cl. E04g 3/14, 1/12
U.S. Cl. 182—36                                              9 Claims

ABSTRACT OF THE DISCLOSURE

Installation for approaching portions of an airplane, including side and top portions thereof, and particularly its body and its tail, for purposes of maintenance, cleaning and/or repair. In their common aspects, the two preferred embodiments provided for these specific purposes comprise supporting means straddling from above portions of the airplane, means for connecting the supporting means to an overhead structure of a hangar and the like, platform means allowing people to approach the airplane and perform work on the straddled side and top portions thereof, and actuating means for selectively moving the supporting means with respect to the overhead structure and the platform means with respect to the airplane portions in question. As to their specific features, the two disclosed embodiments of the installation comprise structural means for respectively approaching the body and the tail of the airplane on which work is to be performed.

---

The present invention relates to an installation for approaching portions of an airplane from all sides, including its top, without using floor space.

There are known devices by which one can approach an airplane from the outside when said airplane is for example to be maintained, repaired, cleaned, or the like. All these known devices approach the airplane from the bottom side thereof. Such devices are, for example, tractors bearing a support on which a platform rests. However, all known devices are only convenient for small airplanes, as the larger the support the more unstable the platform and the more difficult it is to approach the upper part of the airplane and its tail.

Moreover, these known devices require two operators, one as driver of the tractor and one who stands on the platform and performs the required work proper. This is naturally very uneconomical as the driver of the tractor has most of the time no work.

It is therefore the object of the present invention to design an installation by one can easily and conveniently approach airplane portions from all sides, and in particular the upper side or top of the airplane even in case of large airplanes and without the usage of floor space.

It is another object of the present invention to design said installation in such a manner that it saves manpower.

It has now been found that a device which meets said requirements can be designed in such a manner that it is connected to the overhead or ceiling structure of the hangar and therefore the airplane parts can be easily approached from its both sides and from its upper side.

The present invention consists, in its first exemplary embodiment, in an installation for approaching the body of an airplane comprising a frame provided with means which are horizontally glidable in rails, extending along the ceiling of the hangar and with holding means extending vertically downwards. To said holding means is connected a device which may be caused to move in vertical direction, comprising a second frame bearing vertical holding means at the end of which are situated at least one pair of platforms being distanced from each other so that the body of the airplane may be located between them. To the internal end of the platforms is connected a circumferential ladder, means being provided for the actuation of the horizontal movement of the first frame and the vertical movement of the device.

The first frame is initially situated in front of the airplane base.

The frames may be designed, for example, from metal strips or plates having suitable dimensions and the holding means from metal rods, tubes or the like. The platforms are suitable metal plates which may carry the required number of workers, materials, etc.

The means to be connected to the rails are preferably small wheels connected to the frame, which wheels can glide inside said rails.

Naturally the device may be provided with additional parts, e.g. supports, platforms or the like. It may comprise, for example, additional platforms. The circumferential ladder may extend from one platform to another or may be interrupted. An additional platform may be arranged above said ladder.

The means for causing the first frame to move in the horizontal direction or the device in the vertical direction are any common electro-mechanical, mechanical or hydraulic means. Naturally when said frame is caused to move, the entire device moves too so that it may be moved along the entire body of the airplane. Said means are actuated from the platform by way of a control box by an operator who in the remaining time is free to take part in the work to be performed on the body of the airplane.

The described installation is generally so designed that it is not far distanced from the body of the plane, although this may be varied to a certain extent by the vertical movement of the device. Therefore said installation will in most cases not be suitable to approach the tail of the airplane, as usually it cannot be raised along its entire height.

The present invention also consists, in its second exemplary embodiment, in an installation for approaching the tail of an airplane comprising two series of platforms, each series being arranged one upon another, both series being distanced from each other so that the tail of the airplane may be located between them. The platforms extending from a supporting device provided with means to be connected to the ceiling of the hangar. A part of each platform is fixed and another part is horizontally movable from below the fixed part towards the tail of the airplane by way of actuation means being part of the installation.

The supporting means may be designed in any suitable manner, e.g. by a frame to be connected to the ceiling, from which frame extend downwards tubes, rods or the like to which means the platforms are connected.

The means for actuating the movable parts may be any suitable transmission means.

Both installations may be provided with suitable arrangements for mounting thereon ladders, stairs and the like. These arrangements may be part of said installations or may be arranged separately.

The invention will now be described with reference to the accompanying drawings without being limited by them. In these drawings:

FIG. 3 shows a front view of the installation for approaching the tail of the airplane.

Figure 2:
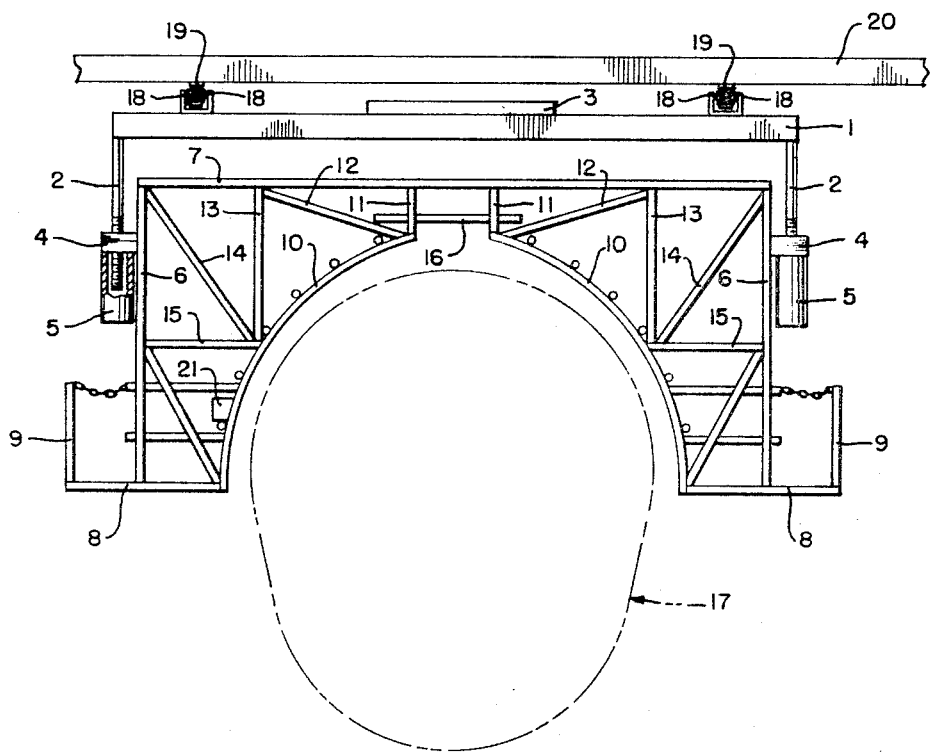
FIG. 2 shows a front view of the installation for approaching the body of the airplane.

The first exemplary installation illustrated in FIG. 2, for airplane bodies, comprises a frame 1 to which are connected supporting means in the form of screws of hydraulic cylinders 2. Upon frame 1 is situated an electro-mechanical actuating or driving equipment indicated schematically by a box 3. Said equipment enables the horizontal movement of frame 1 and the vertical movement of another frame 7, to be described later. Screws 2 are screwed through plates 4 and are introduced into tubes 5, which latter are connected to plates 4. The screws of cylinders 2 may be raised and lowered by way of mechanical means (not shown), thus moving the entire device. In case of hydraulic cylinders, which are connected to plates 4, tubes are not needed.

Plates 4 are connected to other supporting means in the form of columns 6, extending downwards from the aforementioned other frame 7, and bearing at their end platforms 8. People standing on platforms 8 are protected from falling down by lattices 9 as illustrated. Ladder structures 10 extend from platforms 7; they are held by frame 7 and are connected to columns 6 by way of supports 11, 12, 13, 14 and 15. A platform 16 rests on ladders 10. The body 17 of the airplane (see also FIG. 1) can be accommodated between platforms 8. For a better correlation of the preceding description with the terms used in the claims which follow, it should be noted that the elements 6, 7 and 11 to 15 of the first installation described hereinabove constitute essentially, but not exclusively, supporting means at least partly straddling from above portions of the airplane, while in the second installation, the frames 30 perform the same function. Connecting means between said supporting means and the overhead structure 20 are constituted in the first embodiment by elements 1, 18 and 19. Elements 8, 10 and 16 in the first installation constitute platform means which, in the second installation, is made up from upper and lower platforms 31 and 32, being held in both cases by said supporting means. Finally, actuating means for both said supporting and said platform means are made up in the first embodiment from elements 2 to 4 and 21, while in the second, wheels 33 serve the same purpose.

Frame 1 is connected by wheels 18 to rails 19 fixed to a ceiling or roof 20 of the hangar (see also FIG. 1), constituting an overhead structure.

Both the horizontal movement of frame 1 and the vertical movement of frame 7, respectively, are actuated by conventional means from a control box 21, preferably situated on one of platforms 8, and acting on the equipment 3.

It is readily understood that the airplane body 17 can conveniently be approached from platforms 8 and from ladders 10.

The second exemplary installation illustrated in FIG. 3, for airplane tails, comprises frames 30 connected to the roof 20 of the hangar. From frames 30, constituting supporting means, extend fixed upper platforms 31. Below the platforms are arranged movable lower platforms 32, omitted from FIG. 1 for the sake of clarity. Platforms 32 move below the bottom of platform 31 on wheels 33 actuated by transmission means (not shown). The tail 34 of the airplane can be accommodated between platforms 32.

As the aproach to tail 34 can be varied by way of movable platforms 32, it is easily understood that one can conveniently approach all parts of the tail.

Figure 1:
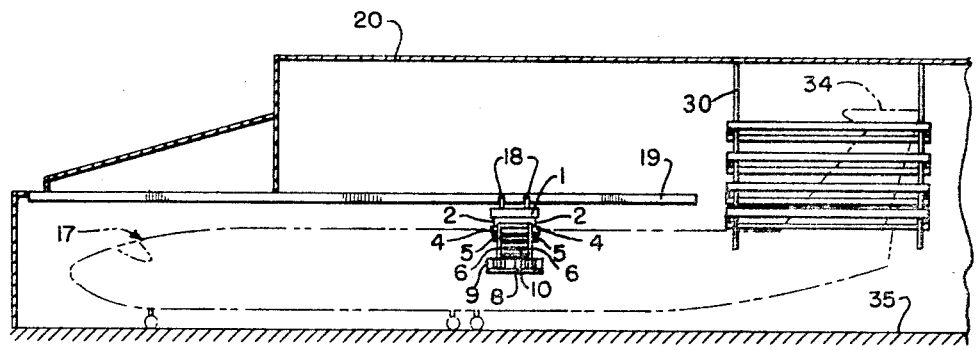
FIG. 1 shows a side view of an airplane on which both installations according to the present invention are arranged.

Both installations illustrated in FIGS. 2 and 3 are standing on bottom or floor 35. FIG. 1 shows both installations in an overall, somewhat schematic view, with reference to the airplane body 17.

It should be noted that in FIG. 2, a screw-type connection has been shown, as a matter of example, at numeral 2, between the frame 1 and the plates 4 attached to the frame 7. This connection may be of the hydraulic or other type suitable for purposes of the inventive installation.

Similarly, FIG. 3 illustrates, again as a matter of example, a wheel- or roller-type connection at 33, between the respective fixed and movable platform portions 31 and 32. Again, the connection may be of other known type which may be used advantageously in this embodiment of the installation.

I claim:

1. An installation for approaching side and top portions of an airplane and the like for purposes of maintenance, cleaning, repair and the like, comprising: supporting means at least partly straddling from above said portions of the airplane; means for connecting said supporting means to an overhead structure of a hangar and the like; platform means held by said supporting means, allowing people to approach the airplane and perform work on the straddled side and top portions thereof; and actuating means for selectively moving said supporting means vertically with respect to the airplane portions to be worked and with respect to the overhead structure, and said platform means horizontally with respect to the airplane portions to be worked on, the latter being laterally straddled by said platform means and thus freely accessible from either side.

2. An installation for approaching portions of an airplane and the like, including side and top portions thereof, for purposes of maintenance, cleaning, repair and the like comprising: supporting means at least partly straddling from above portions of the airplane; means for connecting said supporting means to an overhead structure of a hangar and the like; platform means held by said supporting means, allowing people to approach the airplane and perform work on the straddled side and top portions thereof; and actuating means for selectively moving said supporting means with respect to the overhead structure, and said platform means with respect to the airplane portions to be worked on; wherein the airplane portions to be worked on are at least partly constituted by its tail; said supporting means is constituted by a pair of frame members depending from said connecting means; said platform means includes two series of vertically spaced-apart platforms, a portion of each platform being fixed while another portion is lengthwise movable, from below the fixed portion, toward and away from the airplane tail; and wherein said actuating means includes a horizontally adjustable connection between said fixed and said movable platform portions.

3. The installation as defined in claim 2, wherein said adjustable connection is of the wheel type.

4. The installation as defined in claim 2 or 3, wherein said actuating means includes transmission means for actuating said connection.

5. An installation for approaching parts of an airplane and the like, for purposes of maintenance, cleaning, repair and the like, comprising: supporting means at least partly straddling a part of the airplane; means for connecting said supporting means to an overhead structure of a hangar and the like structure; platform means held by said supporting means, allowing people to approach the airplane and perform work on the straddled part thereof; and actuating means for selectively moving said supporting means with respect to the overhead structure, and said platform means with respect to the airplane part to be worked on; wherein the part to be worked on is its body; said supporting means is constituted by an assembly including frame means with depending columns; said connecting means movably connects said supporting means to the overhead structure and includes means glidable in rail means extending along the overhead structure; said platform means includes at least one pair of platforms held by the ends of said columns, a ladder structure intermediate said platforms and substantially following the configuration of the airplane body, and a second platform resting about midway on said ladder structure, above the airplane body; and wherein said actuating means includes a vertically adjustable connection between said connecting means and said supporting means.

6. The installation as defined in claim 5, wherein said adjustable connection is of the screw type.

7. The installation as defined in claim 5, wherein said adjustable connection is of the hydraulic type.

8. The installation as defined in claim 5, wherein said connecting means further includes a transversal frame member intermediate said glidable means and said connection.

9. The installation as defined in claim 5 or 8, wherein said actuating means further includes drive means for horizontal movement of said supporting means with respect to the overhead structure independently from the vertical adjustment of said connection.

References Cited

UNITED STATES PATENTS

| | | | |
|---|---|---|---|
| 1,117,211 | 11/1914 | Mayes | 182—36 |
| 2,067,344 | 1/1937 | Ringe | 82—36 |
| 2,088,871 | 8/1937 | Ringe | 182—37 |
| 2,245,939 | 6/1941 | Schiller | 182—132 |
| 2,761,396 | 9/1956 | Harlan | 182—36 |
| 2,829,582 | 4/1958 | Abbott | 182—37 |
| 2,925,240 | 2/1960 | Laviolette | 182—36 |

REINALDO P. MACHADO, Primary Examiner

U.S. Cl. X.R.

182—132, 150